United States Patent [19]

Hulsing, II.

[11] Patent Number: 5,066,911
[45] Date of Patent: Nov. 19, 1991

[54] APPARATUS AND METHOD FOR SENSING DISPLACEMENT USING VARIATIONS MAGNETIC FLUX LINKAGE

[75] Inventor: Rand H. Hulsing, II., Redmond, Wash.

[73] Assignee: Sundstrand Data Control, Inc., Redmond, Wash.

[21] Appl. No.: 335,141

[22] Filed: Apr. 7, 1989

[51] Int. Cl.⁵ .............................................. G01B 7/14
[52] U.S. Cl. ........................ 324/207.18; 324/207.12; 324/225
[58] Field of Search ............... 324/207, 208, 260–262, 324/207.18, 207.22, 207.24, 239, 240

[56] References Cited

U.S. PATENT DOCUMENTS

| | | | |
|---|---|---|---|
| 2,445,455 | 7/1948 | Rights et al. | 324/208 X |
| 2,617,854 | 11/1952 | Van Valkenburg | 324/240 |
| 2,697,214 | 12/1954 | Smith | 324/208 X |
| 2,700,758 | 1/1955 | Smith | 324/208 X |
| 2,989,711 | 6/1961 | Smith | 324/208 X |
| 3,005,969 | 10/1961 | Wysocki | 324/208 X |
| 3,116,468 | 12/1963 | Perkins | 324/208 X |
| 3,137,812 | 6/1984 | Andresen | 324/208 X |
| 3,250,982 | 5/1966 | Bowie | 324/208 X |
| 3,477,027 | 11/1969 | Jablonski | 323/51 |
| 3,600,669 | 8/1971 | McClain | 323/51 |
| 3,646,537 | 2/1972 | Erspamer et al. | 340/197 |
| 4,013,911 | 3/1977 | Fujiwara et al. | 324/208 X |
| 4,109,200 | 8/1978 | McNulty | 324/208 |
| 4,112,366 | 9/1978 | Kouril et al. | 324/208 |
| 4,591,795 | 5/1986 | McCorkie | 328/5 |
| 4,678,991 | 7/1987 | Schmidt | 324/207 |
| 4,694,246 | 9/1987 | Avisse | 324/207 |
| 4,786,869 | 11/1988 | Kanai et al. | 324/207 |
| 4,810,964 | 3/1989 | Granberg et al. | 324/207 |

FOREIGN PATENT DOCUMENTS 870921 10/1981 U.S.S.R. ............... 324/208

Primary Examiner—Kenneth A. Wieder
Assistant Examiner—W. S. Edmonds
Attorney, Agent, or Firm—Christensen, O'Connor, Johnson & Kindness

[57] ABSTRACT

A transformer and method for sensing displacement, A linear variable displacement transformer (LVDT) 50, 100, 150, 200, and 250) is disclosed with respect to several embodiment,s each including a core (52, 102, 152, 202, and 252) having a primary leg (56, 104, 154, 204, and 254), and two secondary legs (58 and 60, 106 and 108, 158 and 160, 206 and 208, and 258 and 260). A primary coil (54, 110, 156, 210, and 264) is disposed on the primary leg, and secondary coils (62 and 64, 112 and 114, 162 and 164, 212 and 214, and 266 and 268) are disposed on the secondary legs. Pole pieces (70 and 72, 120 and 122, 170 and 172, 222 and 224, and 274 and 276) are disposed in gaps between the primary leg and each secondary leg, so that they control the reluctance to a magnetic flux produced by an electric current flowing thorugh the primary coil. Displacement of the two pole pieces within the gaps separating facing surfaces of the primary and secondary legs changes the proportion of the magnetic flux through each of the secondary legs and thus varies an electrical signal induced in each of the secondary coils. A differential between the electrical signals thus corresponds to the differential displacement of the pole pieces in each of the embodiments.

30 Claims, 4 Drawing Sheets

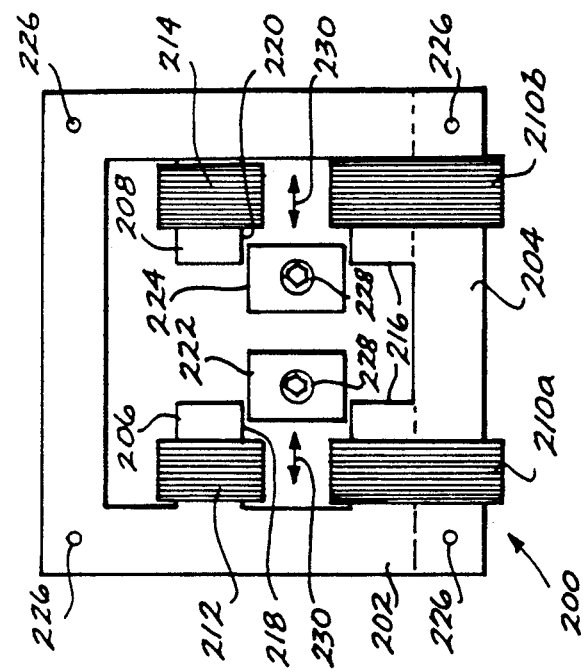
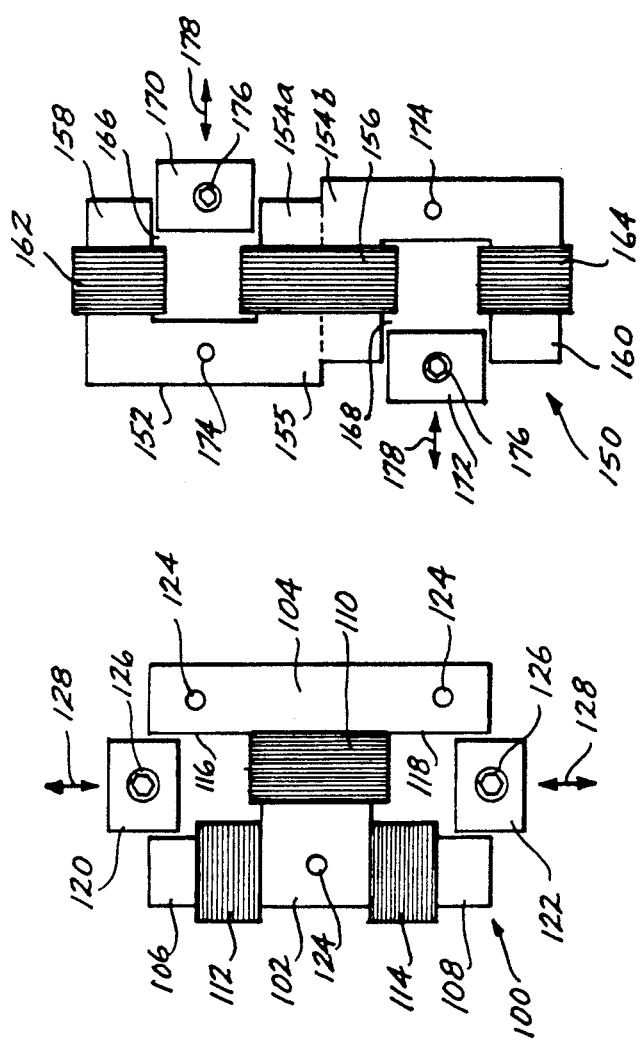
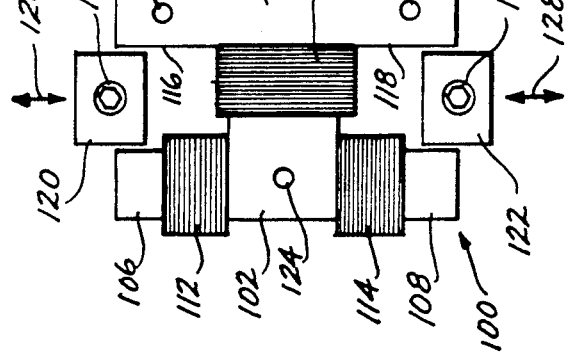

APPARATUS AND METHOD FOR SENSING DISPLACEMENT USING VARIATIONS MAGNETIC FLUX LINKAGE

TECHNICAL FIELD

This invention generally pertains to an apparatus and method for sensing the relative displacement of two structures, and more specifically, to a transformer that produces a signal indicative of such displacement as a result of the distribution of magnetic flux between two secondary coils within the transformer caused by movement of a pole piece.

BACKGROUND OF THE INVENTION

Linear variable displacement transformers (LVDTs) are frequently employed to monitor differential motion in apparatus. A typical prior art LVDT includes an E-shaped core having a primary coil disposed around its center leg and two secondary coils, each disposed around one of the other two legs, at opposite ends of the core. A pole piece, which is approximately as long as the core, carries magnetic flux between the center leg and both of the end legs. Very small gaps separate the pole piece from the outwardly facing ends of each of the three legs of the core. As the pole piece moves from one end of the core toward the other end, it couples more of the magnetic flux through one of the end legs than through the other, creating a differential electrical signal (voltage or current) in the two secondary coils. A circuit connected to the two secondary coils demodulates the differential electrical voltage or current, producing a signal indicative of the displacement of the two parts of the apparatus, i.e., the displacement of the pole piece relative to the core.

One of the problems associated with a conventional LVDT concerns its sensitivity to rotation of the pole piece with respect to the core. As the pole piece rotates, the gap between one of the end legs and the pole piece decreases and the gap between the other end leg and pole piece increases. Accurate detection of the relative *linear displacement* of the pole piece and the core is predicated on the assumption that the separation or gap between the pole piece and each end leg does *not vary*. The reluctance between the pole piece and each end leg is proportional to this gap distance divided by the cross-sectional area of the end leg overlapped by the pole piece. The relative displacement of the pole piece with respect to the core should therefore change *only* the cross-sectional area of the overlap, not the gap distance; however, motion of the apparatus to which the pole piece is attached may inherently cause the pole piece to rotate slightly. Rotation of the pole piece distorts the differential signal from the secondary coils so that it no longer accurately indicates the longitudinal displacement of the pole piece relative to the core.

SUMMARY OF THE INVENTION

In accordance with the present invention, an apparatus is provided for producing a signal indicative of a displacement. An electromagnetic core includes a primary leg and two secondary legs. A primary pole is formed on the primary leg, separated by gaps from two secondary poles, which are formed on adjacent facing surfaces of the two secondary legs. Around the primary leg of the core is disposed a primary coil, while secondary coils are disposed around each of the secondary legs. The primary coil is adapted to connect to a source of electrical current, which causes a magnetic field to be developed across the two gaps that separate the primary pole from the secondary poles.

Two pole pieces are included, each pole piece being disposed generally within one of the gaps. Displacement of the pole pieces varies the reluctance to magnetic flux across each gap by changing the extent to which each pole piece lies within the gap between the primary pole and one of the secondary poles. Variations in the reluctance due to the displacement of the pole pieces causes an electric signal that is induced in each of the secondary coils by the magnetic flux flowing within the core to vary in a substantially linear manner.

In one preferred form of the apparatus, the pole pieces move in and out of the gaps in a direction generally aligned with a plane passing through the longitudinal center of the core. According to another form of the invention, the pole pieces move in and out of the gaps in a direction generally transverse to the plane.

The apparatus may further comprise detector means, connected to the secondary coils, for monitoring the electrical signal induced therein. The detector means thus produce an output signal that varies as a function of the displacement as the position of the pole pieces within the gaps changes. The detector means are responsive to a difference in the electrical signal produced by the secondary coils, which results from a differential displacement of the pole pieces within the two gaps. Further, the detector means may include an automatic gain control to control the magnitude of the electrical current applied to the primary coil from the source. In order to maintain the total flux produced by the primary coil constant, the automatic gain control adjusts the electrical current applied to the primary coil in response to the sum of the electrical signals induced in the secondary coils.

The pole pieces are generally quadrilateral blocks, preferably having a different thickness than the core. Because of this difference in thickness, the reluctance to magnetic flux in the gaps is less affected by displacement of the pole pieces in a direction aligned with that over which the thickness of the pole pieces is measured. The reluctance of the pole pieces to magnetic flux in the gaps is substantially independent of misalignment of either pole piece relative to the primary pole and the secondary poles, so long as the misalignment does not cause the pole piece to contact the primary or secondary poles (causing frictional errors) and does not reduce the extent of overlap of the pole pieces with respect to these poles.

A further aspect of the invention is directed to a method for sensing a differential displacement, comprising steps that are related to the functions of the above described components of the apparatus.

Brief Description of the Drawings

FIG. 3 is a side elevational view of a second embodiment of the present invention;

FIG. 4 is a side elevational view of a third embodiment;

FIG. 5 is a side elevational view of a fourth embodiment;

Description of the Preferred Embodiment

Figure 1:
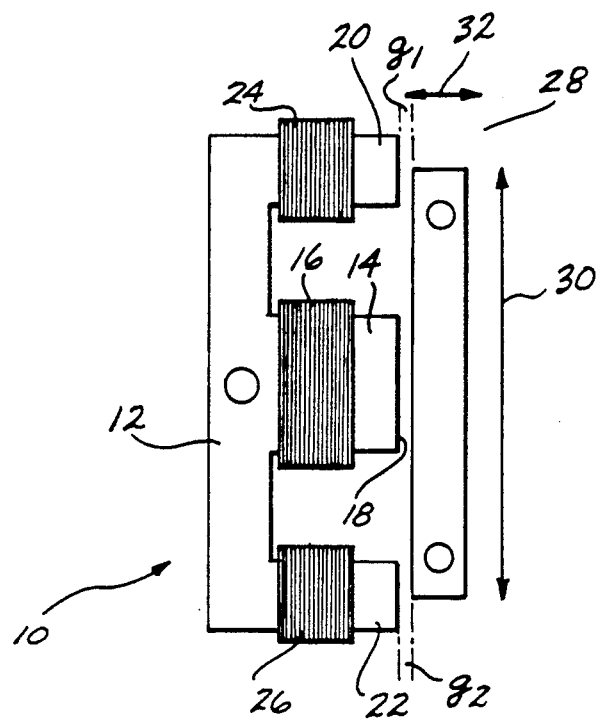
FIG. 1 is a side elevational view of a prior art LVDT.

In FIG. 1, an LVDT 10 is shown, generally representative of prior art devices used to monitor the displacement of a structure. For purposes of this disclosure and the claims that follow, the term "structure" encompasses any configuration that includes two separate members, which move relative to each other, or a single member having two spaced apart points that move relative to each other, the displacement of these members or points on a member being the parameter that the LVDT is intended to monitor. The prior art device shown in FIG. 1 includes an E-core 12, so-called because its configuration resembles the letter "E". Extending from the center of E-core 12 is a primary leg 14, about which is wrapped a primary coil 16. A source (not shown) of alternating electrical current is connected to primary coil 16, the electrical current passing through the primary coil causing it to produce a magnetic field having a periodically varying polarity, at a pole face 18.

E-core 12 also includes secondary legs 20 and 22, about which are respectively disposed secondary coils 24 and 26. A pole piece 28, which is approximately the same thickness as E-core 12, but slightly shorter in length, is positioned in close proximity to pole face 18, separated from the faces of secondary legs 20 and 22 by gaps g1 and g2, respectively. Since pole piece 28 comprises a ferromagnetic material having a relatively high magnetic permeability, a majority of the magnetic flux from primary leg 14 passes through pole piece 28 to the secondary legs, rather than through the air that separates the primary and secondary legs. The proportion of this magnetic flux that passes through secondary leg 20 as compared to that through secondary leg 22 is a function of the extent to which pole piece 28 overlaps the the ends of the respective secondary legs. As pole piece 28 is displaced upwardly (with respect to the orientation shown in FIG. 1), it overlaps less of secondary leg 22. Consequently, more of the magnetic flux from primary coil 16 flows into secondary leg 20 than into secondary leg 22, and a greater electrical signal (voltage or current) is induced in secondary coil 24 than in secondary coil 26. The differential between the electrical signal induced in secondary coils 24 and 26 is thus indicative of the relative displacement of pole piece 28 with respect to E-core 12.

Ideally, unless LVDT 10 is intended to sense the rotation of pole piece 28 relative to E-core 12, the differential between the electrical signals induced in secondary coils 24 and 26 should depend *solely* upon the linear displacement of pole piece 28 along the directions indicated by an arrow 30. However, if pole piece 28 rotates so that gaps g1 and g2 change, there is a corresponding change in the electrical signals induced in each of secondary coils 24 and 26. Specifically, as gap g1 increases and gap g2 decreases because of the rotation of pole piece 28, a greater electrical signal is induced in secondary coil 26 due to the increase of magnetic flux within secondary leg 22, and correspondingly a smaller electrical signal is induced in secondary coil 24 due to the decrease in magnetic flux within secondary leg 20. The differential in the electrical signals induced within secondary coils 24 and 26 is thus distorted, and no longer truly represents *only* the relative linear displacement of pole piece 28 with respect to E-core 12 in the direction of arrow 30. By comparison, the present invention is generally insensitive to such rotation.

Figure 2A:
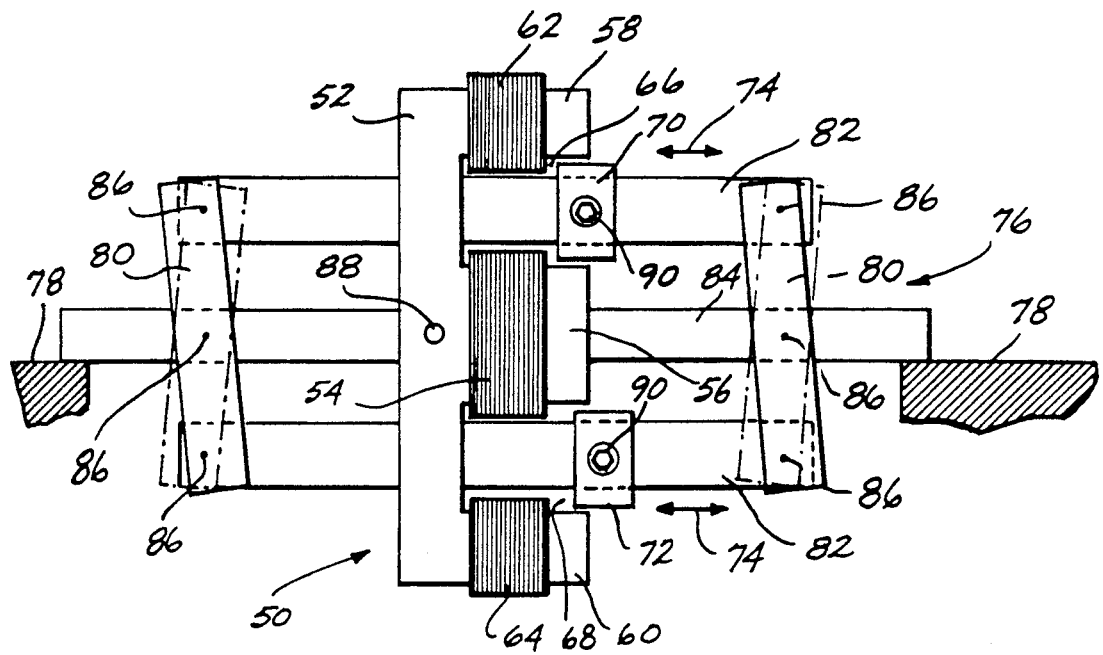
FIG. 2A is a side elevational view of a first embodiment of a LVDT in accordance with the present invention, schematically showing a parallelogram frame to which the LVDT is attached, to monitor differential displacement.
Figure 2B:
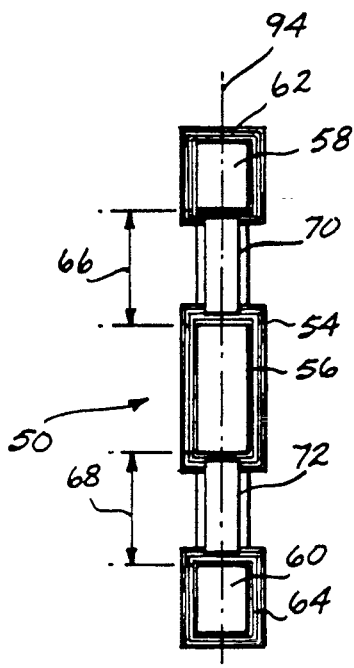
FIG. 2B is an end elevational view of the first embodiment.

A first embodiment of an LVDT 50 in accordance with the present invention is shown in FIGS. 2A and 2B. LVDT 50 also includes an E-core 52 having a primary leg 56 at the center, about which is wrapped a primary coil 54, and secondary legs 58 and 60, which are disposed at opposite ends of E-core 52. Secondary coils 62 and 64 are wrapped around secondary legs 58 and 60, respectively. A gap 66 is defined between the two facing surfaces of secondary leg 58 and primary leg 56; similarly, a gap 68 is defined between the opposite surface of primary leg 56 and the facing surface of secondary leg 60. A pole piece 70 is disposed within gap 66, and a pole piece 72 within gap 68, at least a portion of each of the pole pieces overlapping with the adjacent facing surfaces of the secondary and primary legs of E-core 52. In this and each of the following embodiments, the pole pieces are generally quadrilateral blocks, preferably formed from sections of the same type of high $\mu$ ferromagnetic laminated material used for the core. Magnetic flux is produced in E-core 52 by applying a periodically varying electrical current to primary coil 54. Pole pieces 70 and 72 couple the magnetic flux into secondary legs 58 and 60. The proportion of magnetic flux that circulates through each secondary leg depends on the extent that each of pole pieces 70 and 72 lie within gaps 66 and 68. With respect to the orientation shown in FIG. 2, as pole piece 70 moves farther into gap 66, the extent of overlap of the pole piece with the facing surfaces of primary leg 56 and secondary leg 58 increases. The high magnetic permeability of pole piece 70 compared to that of air reduces the reluctance to magnetic flux in the gap, so that proportionally more magnetic flux flows within secondary leg 58. As a result, the electrical signal induced in secondary coil 62 increases. Conversely, as pole piece 72 moves further out of gap 68, the reluctance to magnetic flux in the gap increases, decreasing the proportion of magnetic flux in secondary leg 60 and reducing the electrical signal induced in secondary coil 64. If pole piece 70 is translated farther into gap 66 at the same time that pole piece 72 is translated farther out of gap 68, a differential between the electrical signals induced in secondary coils 62 and 64 is created, which is proportional to the differential displacement of pole pieces 70 and 72. Similarly, as pole pieces 70 and 72 move in the opposite direction, the differential between the electrical signals induced within secondary coils 62 and 64 changes in a corresponding manner. Arrows 74 in FIG. 2A illustrate the directions in which pole pieces 70 and 72 move back and forth within gaps 66 and 68, respectively, in one preferred form of LVDT 50.

To illustrate how LVDT 50 can be used to monitor displacement of a structure, the device is shown connected to a parallelogram frame 76 in FIG. 2A. At opposite sides of parallelogram frame 76, two vertical members 80 are connected at each end to horizontal members 82 and to a central, fixed member 84, by flexure pivots 86. Each end of fixed member 84 extends beyond one of the vertical members 80 and is attached to supports 78. A driving device (not shown) is connected at one side of parallelogram frame 76, causing the horizontal members to vibrate back and forth in the directions indicated by arrow 74. Bolts 90 connect pole pieces 70 and 72 to the horizontal members of the parallelogram frame so that the pole pieces move with the parallelogram frame as it vibrates back and forth. E-core 52 is connected to fixed member 84 by a bolt 88, and it remains at rest relative to the back-and-forth motion of horizontal members 82 and pole pieces 70 and 72. The differential between the electrical signals induced in secondary coils 62 and 64 by the displacement of the pole pieces can be used as a feedback signal to control the driving device that causes parallelogram frame 76 to vibrate back and forth. A prior art LVDT, similar to LVDT 10 shown in FIG. 1, has been used for this purpose in a Coriolis rate and acceleration sensor, as disclosed in U.S. Pat. No. 4,782,700, which is assigned to the same assignee as the present invention.

In FIG. 2B, it is apparent that the pole pieces are substantially thinner in cross section than the core, (measured transversely to the direction of arrow 74 in FIG. 2A). Consequently, pole pieces 70 or 72 may be slightly displaced to either side within gaps 66 and 68, respectively, i.e., in the direction in which the thickness of the pole pieces is measured, without affecting the reluctance to magnetic flux across the gaps. Alternatively, the same result may be achieved by making E-core 52 substantially thinner than the pole pieces. As is also generally true of other embodiments of the invention described below, misalignment of the pole pieces within the gaps only affects their reluctance to magnetic flux if the misalignment is sufficient to change the extent of cross-sectional overlap of the pole pieces with the adjacent facing surfaces of the primary leg and secondary legs.

Figure 2C:
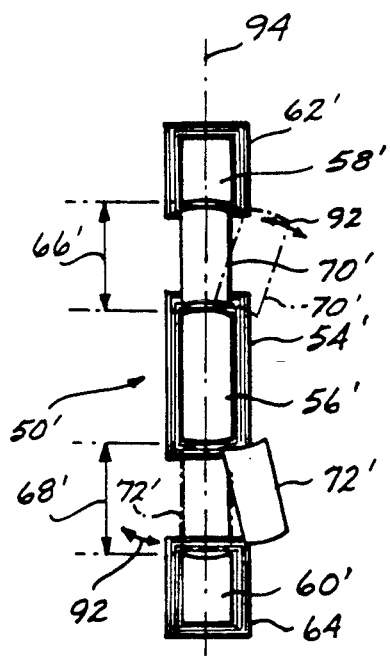
FIG. 2C is an end elevational view of the first embodiment, modified for sensing arcuate displacement of the pole pieces in a direction generally transverse to the linear displacement of the embodiment in FIGS. 2A and 2B.

FIG. 2C illustrates a modified LVDT 50' that produces a signal indicative of the arcuate displacement of pole pieces 70' and 72' within gaps 66' and 68', for example, due to the back-and-forth motion of a member (not shown) that pivots about an axis extending through a primary leg 56' of an E-core 52'. LVDT 50' is the same as LVDT 50, except that the facing surfaces of primary leg 56' and secondary legs 58' and 60' are formed in an arc centered about the axis around which pole pieces 70' and 72' are displaced, generally as indicated by arrows 92, and the pole pieces are not aligned with each other. The motion of pole pieces 70' and 72' within gaps 66' and 68' is in a direction that is substantially transverse to a plane 94 through the center of E-core 52'. (For purposes of this disclosure and the attached claims, the arc described by the displacement of the pole pieces is transverse to the plane through the center of the core if a tangent to the arc where it intersects the plane is transverse to the plane.) It should also be apparent from FIGS. 2B and 2C that LVDT 50 could be modified by making E-core 52 the same thickness as pole pieces 70 and 72 to facilitate sensing *linear* back-and-forth motion of the pole pieces in a direction transverse to plane 94.

Turning now to FIG. 3, a second embodiment of the present invention is shown, generally identified as LVDT 100. LVDT 100 includes an H-core 102, having a primary leg 104 connected to two secondary legs 106 and 108. A primary coil 110 is formed around primary leg 104, and secondary coils 112 and 114 are disposed, respectively, around secondary legs 106 and 108. Primary leg 104 splits to form gaps 116 and 118, with respect to opposing surfaces of secondary legs 106 and 108. A pole piece 120 is disposed within gap 116, and a pole piece 122 within gap 118. Bolts 124 connect H-core 102 to a base plate (not shown), while bolts 126 connect pole pieces 120 and 122 to a structure that is displaced with respect to H-core 102, in the direction shown by arrows 128.

Unlike the previous embodiment, LVDT 100 is useful in detecting displacement of pole pieces 120 and 122 in the same direction. For example, as pole piece 120 moves upwardly, less of it is disposed within gap 116, so that the reluctance to magnetic flux across gap 116 increases, while at the same time, the reluctance to magnetic flux in gap 118 decreases as pole piece 122 moves upwardly, farther into gap 118. Accordingly, a greater proportion of the total magnetic flux produced by primary coil 110 passes through secondary leg 108, inducing an increasingly greater electrical signal in secondary coil 114, as compared to the portion of the total magnetic flux passing through secondary leg 106 and the corresponding electrical signal induced in secondary coil 112. The differential between the electrical signals induced in the two secondary coils is thus indicative of the displacement of pole pieces 120 and 122 within gaps 116 and 118.

In FIG. 4, a third embodiment of an LVDT in accordance with the present invention is shown at reference numeral 150. LVDT 150 includes an S-shaped core 152, which may optionally comprise two C-shaped cores 154a and 154b, connected so that they face in opposite directions. C-shaped cores 154a and 154b may be joined either by interleaving their laminations or by adherently securing their adjacent edges with a suitable adhesive, such as epoxy. Use of the two C-shaped cores facilitates insertion of a primary coil 156 over the conjoined sides of the C-shaped cores, since primary coil 156 may be prewound and slid into place as the C-shaped cores are joined together. The opposite ends of the resulting S-shaped core 152 include secondary legs 158 and 160, on which are disposed secondary coils 162 and 164, respectively. A gap 166 is defined between the inner surface of secondary leg 158 and the opposed facing surface of a primary leg 155. Similarly, a gap 168 is defined between the inner surface of secondary leg 160 and the opposed facing surface of C-shaped core 154b. A pole piece 170 is disposed within gap 166 and a pole piece 172 within gap 168. Differential displacement of the two pole pieces within gaps 166 and 168 varies the reluctance to magnetic flux between each of secondary legs 158 and 160 and primary leg 155.

Bolts 174 connect S-shaped core 152 to one portion of a structure (not shown), and bolts 176 connect the pole pieces to other portions of the structure, so that the pole pieces move back and forth in the directions indicated by arrows 178. As pole piece 170 moves farther into gap 166, pole piece 172 moves farther out of gap 168. As a result, the proportion of magnetic flux produced by primary coil 156 that pass through pole pieces 170 and 172 changes as a function of the extent of overlap of the pole pieces with the facing surfaces of secondary legs 158 and 160, and primary leg 155. The variation in reluctance in gaps 166 and 168 caused by displacement of the pole pieces changes the magnetic flux that flows through secondary legs 158 and 160, and thereby changes the electrical signals induced in secondary coils 162 and 164. A differential between these two electrical signals is thus indicative of the differential displacement of pole pieces 170 and 172.

In a fourth embodiment shown in FIG. 5, an LVDT 200 includes a primary leg 204 that extends along the lower portion of a generally rectangular-shaped core 202. Secondary legs 206 and 208 extend inwardly toward each other from each side of core 202, spaced apart from stub portions 216 of primary leg 204. A primary coil is disposed on primary leg 204, split into two parts 210a and 210b, which include an equal number of turns, but are wound series opposing. The two parts of the primary coil respectively fit over one of the stubs 216, adjacent each side of the core. Primary leg 204 may be adhesively attached to the lower surface of stub 216 after primary coils 210 are slid into place, so that the primary coils need not be wound in place. Alternatively, primary leg 204 may be connected to the remainder of core 202 by interleaving the laminations of the core in the area of stub 216. Secondary coils 212 and 214 are disposed on secondary legs 206 and 208, respectively. A pole piece 222 is disposed within a gap 218, formed between facing surfaces of secondary leg 206 and one of the stubs 216, while a pole piece 224 is disposed within a gap 220, formed on the opposite side of core 202, between facing surfaces of secondary leg 208 and the other stub 216. Primary coil 210 is energized with a periodically varying electric current, producing a magnetic flux that circulates through core 202. Stubs 216 are of common magnetic polarity, opposite that of the facing surfaces of secondary legs 206 and 208.

Magnetic flux flowing through pole pieces 222 and 224 within gaps 218 and 220 is conveyed into secondary legs 206 and 208, inducing corresponding electrical signals in secondary coils 212 and 214. As pole pieces 222 and 224 are displaced from side to side in the direction indicated by arrows 230, the reluctance to the magnetic flux through gaps 218 and 220 varies with the extent that pole pieces 222 and 224 overlap the opposite facing surfaces of the secondary legs and stubs 216. As one pole piece moves farther into one of the gaps, the other moves farther out of the other gap, so that the total flux produced by primary coils 210a and 210b is divided between secondary legs 206 and 208 in proportion to the displacement of pole pieces 222 and 224. Bolts 226 are used to attach core 202 to one portion of a structure (not shown), while bolts 228 secure pole pieces 222 and 224 to other portions of the structure. Accordingly, a differential between the electrical signals induced in secondary coils 212 and 214 varies in response to the relative displacement of the pole pieces within the gaps.

Figure 6:
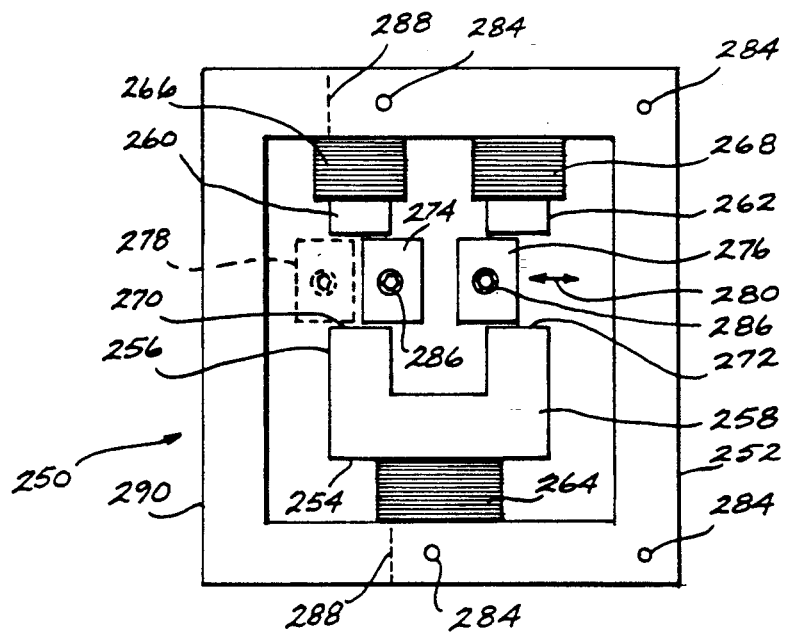
FIG. 6 is a side elevational view of a fifth embodiment.

Finally, in accordance with the present invention, a fifth embodiment is shown with respect to an LVDT 250, in FIG. 6. LVDT 250 comprises a core 252, which also has a rectangular shape, similar to LVDT 200. Core 252 includes a primary leg 254 that is divided into a first branch 256 and a second branch 258, the ends of which are disposed opposite secondary legs 260 and 262, which extend inwardly from the other side of core 252. A primary coil 264 is wrapped around the base of primary leg 254, producing a magnetic flux across gaps 270 and 272. These gaps respectively separate first branch 256 of the primary leg from secondary leg 260 and second branch 258 from secondary leg 262. Secondary coils 266 and 268 produce an electrical signal in response to the portion of the total magnetic flux produced by primary coil 264 that circulates within secondary legs 260 and 262. Pole pieces 274 and 276 are interposed within gaps 270 and 272, and the reluctance to magnetic flux across the gaps varies as a function of the displacement of the pole pieces within the gaps. As one of pole pieces 274 and 276 moves farther into a gap, the other moves farther out, varying the distribution of magnetic flux and the resulting electrical signal induced in each of secondary coils 266 and 268. A differential between the electrical signals induced in secondary coils 266 and 268 is thus indicative of the differential displacement of pole pieces 274 and 276. The pole pieces move back and forth within gaps 270 and 272, generally in the direction of arrow 280; however, the pole pieces can be arranged to move simultaneously either in the same direction, or in opposite directions as indicated by the position of a phantom pole piece 278. From their present illustrated positions, phantom pole piece 278 would move to the right as pole piece 276 moves farther left.

Bolts 284 secure core 252 in place on a structure (not shown), and other portions of the structure are connected to pole pieces 274 and 276 by bolts 286. Of course, if pole pieces 274 and 276 move in opposite directions with respect to each other, they would likely not be joined to a common member.

Optionally, as indicated by dash lines 288, a portion 290 (comprising the left side) of core 252 may be cut away or the core formed without it, since the right half of core 252 provides the necessary magnetic connection or coupling between one end of primary leg 254 and each of secondary legs 260 and 262. Removing or deleting portion 290 of core 252 facilitates winding primary coil 264 in place, by providing access from one side.

Figure 7:
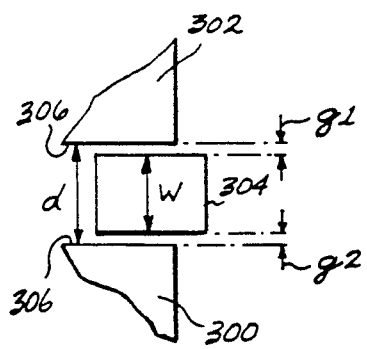
FIG. 7 schematically shows a pole piece within a gap between a primary and a secondary pole, illustrating the insensitivity of the present invention to centering the pole piece between the primary and secondary poles.

Referring to FIG. 7, part of a primary leg 300 and part of a secondary leg 302 (representative of the primary and secondary legs of any of the preferred embodiments disclosed above) are shown, along with a representative pole piece 304. The total reluctance to magnetic flux across a gap 306 between the primary and secondary legs is defined by the following equation:

$$R_{total} = g_1/\mu A + g_2/\mu A = (g_1 + g_2)/\mu A$$

Where $g_1$ is the spacing between pole piece 304 and secondary leg 302; $g_2$ is the spacing between primary leg 300 and pole piece 304; $\mu$ is the relative magnetic permeability of the pole piece; and A is the area of overlap between pole piece 304 and adjacent facing portions of secondary leg 302 and primary leg 300. The total width of gap 306 is equal to d and the total width of pole piece 304 is equal to w, such that $d - w = g_1 + g_1$, which is fixed. Accordingly, pole piece 304 can translate vertically up and down in gap 306 between secondary leg 302 and primary leg 300, changing the relative sizes of $g_1$ and $g_2$, without changing the reluctance to magnetic flux within gap 306. The only constraint to the vertical position, i.e., the vertical centering of pole piece 304 within the gap is that its vertical position not change the area of overlap, A, and that the pole piece not contact secondary leg 302 or primary leg 300, since such frictional contact might interfere with the displacement monitored by the LVDT.

Figure 8:
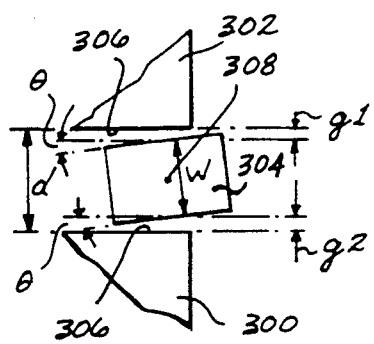
FIG. 8 schematically shows a pole piece within a gap between a primary and secondary pole, illustrating the insensitivity of the present invention to rotational misalignment of the pole piece *within* the gap.

Similarly, with reference to FIG. 8, parts of representative primary and secondary legs 300 and 302 are again shown defining gap 306 in which a representative pole piece 304 is positioned. This figure illustrates that the reluctance to magnetic flux across gap 306 is substantially unchanged by the rotation of pole piece 304 through a small angle $\theta$, about an axis 308 that extends transverse to a plane through the center of the primary and secondary legs. Again, there is a constraint that rotation of pole piece 304 about axis 308 not significantly change the area of overlap of pole piece 304 with respect to the facing surfaces of secondary leg 302 and primary leg 300. For the small angle $\theta$ of rotation of the pole piece within the gap, any decrease in the *effective* spacing $g_1$ is offset by a corresponding increase in the *effective* spacing $g_2$, as defined above. Accordingly, so long as the area of overlap does not change and pole piece 304 does not contact either the primary or secondary legs, the effect of a small rotational misalignment of the pole piece within gap 306 on the reluctance to magnetic flux across the gap is substantially nil. This insensitivity to rotational misalignment applies to all embodiments of the present invention.

Figure 9:
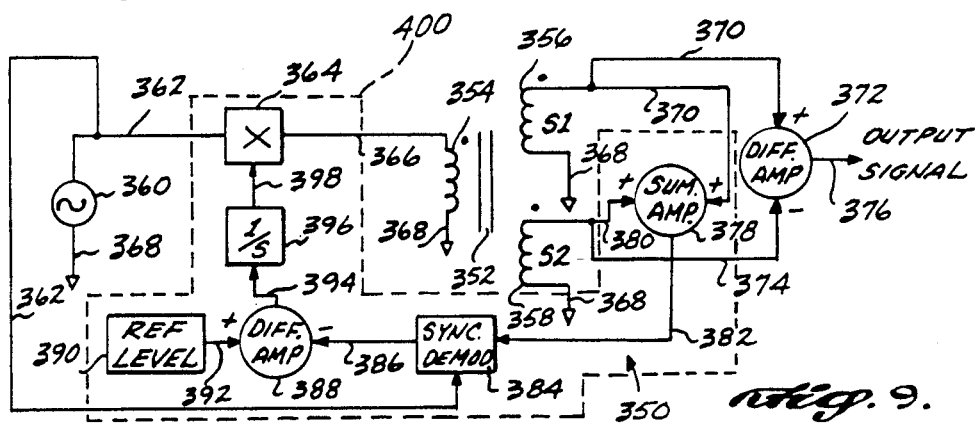
FIG. 9 is a schematic block diagram of a control circuit used to monitor the electrical signals induced in the secondary coils and to provide automatic gain control of the electrical current applied to the primary coil.

A control circuit that can be used with all of the embodiments of the LVDT disclosed above is shown in FIG. 9 at reference numeral 350. In fact, control circuit 350 may be used with virtually any LVDT that includes a primary coil and two secondary coils connected to provide a differential electrical signal in response to a displacement that causes a differential change in the coupling between a primary coil and two secondary coils. Accordingly, the LVDT comprises a core 352, provided to magnetically couple a primary coil 354 to two secondary coils 356 and 358. Primary coil 354 is energized with a periodically varying electrical current, causing a corresponding voltage to be induced in secondary coils 356 and 358. Alternatively, control circuit 350 can be made responsive to the electrical current induced in the secondary coils. Control circuit 350 includes an automatic gain control 400 and is operative to produce an output signal indicative of displacement. As described above, the comparative induced voltage in the two secondary coils corresponds to the reluctance coupling magnetic flux to each secondary coil.

A lead 362 connects a source 360 of electrical current to a voltage controlled multiplier 364, and a lead 366 connects the output of the voltage controlled multiplier to primary coil 354. Ground leads 368 connect the other side of the current source and one side of primary coil 354 and secondary coils 356 and 358 to ground potential. A lead 370 connects to the other side of secondary coil 356, conveying current to the noninverting input of a differential amplifier 372 and to one input of a summing amplifier 378. Similarly, the other side of secondary coil 358 is connected to the inverting input of differential amplifier 372 and to the other terminal of summing amplifier 378, by a lead 374. The output of differential amplifier 372 appears on a lead 376, and comprises a differential signal corresponding to the difference between the voltages induced in secondary coils 356 and 358 as a result of the coupling of magnetic flux produced by primary coil 354. Lead 376 thus conveys an output signal that can be used as feedback to control a driver that causes displacement of apparatus to which the LVDT is attached, or for other purposes.

A lead 382 conveys the output signal from summing amplifier 378 to a synchronous demodulator 384. Synchronous demodulator 384 is connected by lead 362 to an electrical current source 360, and is thus supplied with a signal enabling it to demodulate the output signal from summing amplifier 378. The demodulated signal is conveyed through a lead 386 to the inverting input of a differential amplifier 388. A reference level source 390 provides a stable reference signal, which is conveyed by a lead 392 to the noninverting input of differential amplifier 388. A lead 394 conducts the output signal from differential amplifier 388, which corresponds to the difference between the demodulated signal and the reference level signal, to a free integrator 396. Free integrator 396 integrates this difference signal over time, providing a drive signal over a lead 398 to control multiplier 364 so that electrical current applied to the primary coil is adjusted to maintain the total magnetic flux substantially constant. This automatic gain control thus compensates for changes in total reluctance to magnetic flux, such as might occur, for example, as a result of common mode displacement of the pole pieces. For example, if both pole pieces simultaneously move farther into their respective gaps, the *total* reluctance decreases, causing automatic gain control 400 to reduce the current applied to primary coil 354.

While the present invention has been disclosed with respect to preferred embodiments and modifications thereto, it will be understood by those of ordinary skill in the art that further modifications may be made within the scope of the claims that follow below. Accordingly, it is not intended that the invention in anyway be limited in scope by the disclosure, but instead that it be determined entirely by reference to the claims that follow.

The embodiments of the invention in which an exclusive property or privilege is claimed are defined as follows:

1. Apparatus for producing a signal indicative of displacement, comprising:
    (a) an electromagnetic core, said core integrally including a primary leg and two secondary legs and having a primary pole formed on the primary leg, separated by gaps from two secondary poles that are each formed on adjacent facing surfaces of the two secondary legs;
    (b) a primary coil disposed around the primary leg of the core, said primary coil being adapted to connect to a source of electric current, said electric current causing magnetic fields to be developed across the gaps that separate the primary pole from each of the secondary poles;
    (c) two secondary coils, each disposed around one of the two secondary legs of the core; and
    (d) two pole pieces, each disposed generally within one of the gaps, displacement of the pole pieces within said gaps varying a reluctance to magnetic flux across each gap by changing the extent to which each pole piece lies with the gap between the primary pole and one of the secondary poles, variations in the reluctance due to said displacement of the pole pieces causing an electric signal induced in each of the secondary coils by the magnetic flux flowing within the core and across the gaps to vary in a substantially linear manner.

2. The apparatus of claim 1, wherein the pole pieces move in and out of the gaps in a direction generally aligned with a plane passing through the longitudinal center of the core.

3. The apparatus of claim 1, wherein the pole pieces move in and out of the gaps in a direction generally transverse to a plane passing through the longitudinal center of the core.

4. The apparatus of claim 1, further comprising detector means, connected to the secondary coils, for monitoring the electric signal induced therein and producing an output signal that varies as a function of the displacement as the position of pole pieces within the gaps changes.

5. The apparatus of claim 4, wherein the detector means are responsive to a difference in the electrical signals induced in the secondary coils, where said difference results from a differential displacement of the pole pieces with respect to the two gaps.

6. The apparatus of claim 4, wherein the detector means include an automatic gain control to control the magnitude of the electrical current applied to the primary coil from said source in response to a sum of the electrical signals induced in the secondary coils, so as to maintain the total magnetic flux produced by the primary coil substantially constant.

7. The apparatus of claim 1, wherein the pole pieces comprise generally quadrilateral blocks and have-a-substantially different thickness than the core, so that the reluctance to magnetic flux in the gaps is affected less by displacement of the pole pieces in a direction aligned with that over which the thickness of the pole pieces is measured.

8. The apparatus of claim 1, wherein the reluctance of the pole pieces to the magnetic flux in the gaps is substantially independent of misalignment of either pole piece relative to the primary pole and the secondary poles, so long as the misalignment does not cause the pole pieces to contact the primary or secondary poles causing frictional errors and does not change the extent of overlap of the pole pieces with respect to said poles.

9. Apparatus for sensing the translation of one part of a structure relative to another part, comprising: a transformer including a primary coil magnetically coupled to two secondary coils on a common core, said core defining two spaced-apart gaps, magnetic flux produced by the primary coil being conveyed across each gap by a pair of pole pieces disposed within said gaps, one pole piece being connected to one part of the structure and the other pole piece being connected to the other part of the structure, translation of one part of the structure relative to the other causing one of the pole pieces to move farther into one of the gaps and the other pole piece to move farther out of the other gap, thereby changing the magnetic flux conveyed through each gap and thus changing the relative electrical signals induced in each secondary coil, a difference in the electrical signals induced in the secondary coils being indicative of the translation of said one part of the structure relative to said other part thereof.

10. The apparatus of claim 9, wherein the core comprises three legs and wherein the two gaps are disposed between facing surfaces of the three legs, the first and the second part of the structure translating back and forth in opposite directions, generally in parallel alignment with the three legs of the core.

11. The apparatus of claim 9, wherein the first and the second part of the structure translate back and forth in opposite directions, generally transverse to a plane extending through a center of the core.

12. The apparatus of claim 9, further comprising an alternating current source connected to supply electrical current to the primary coil.

13. The apparatus of claim 12, further comprising detector means, connected to monitor the difference between the electrical signals induced in the secondary coils, for producing an output signal indicative of the translation of the one part of the structure relative to the other part.

14. The apparatus of claim 13, wherein the detector means are further operative to determine the sum of electrical signals induced in the secondary coils and to produce an automatic gain control signal as a function of the sum of those electrical signals, said detector means including means for controlling the magnitude of the electrical current supplied to the primary coil in response to the automatic gain control signal, to maintain the total magnetic flux produced by the primary coil substantially constant in compensation for changes caused by a common mode displacement of the pole pieces within the two gaps.

15. The apparatus of claim 9, wherein the electrical signal induced in each of the secondary coils is substantially insensitive to the spacing within the gaps, between each pole piece and the core, so long as the pole pieces do not contact the core.

16. The apparatus of claim 9, wherein the electrical current induced in each of the secondary coils is substantially insensitive to rotation of the pole pieces within the gaps relative to the core, so long as the rotation does not cause the pole pieces to contact the core causing frictional errors and does not change the extent to which the pole pieces extend into the gaps.

17. The apparatus of claim 9, wherein the pole pieces comprise generally quadrilateral blocks and have a substantially different thickness than the core to minimize the effect of displacement of the pole pieces within the gaps in a direction aligned with that in which the thickness of the pole pieces is measured.

18. A linear variable displacement transformer (LVDT) for sensing a differential displacement of a structure, comprising:
  (a) an electromagnetic core that includes a plurality of integral sections spaced apart from each other to define a first gap and a second gap;
  (b) primary coil means disposed on the electromagnetic core, for producing a magnetic flux across the first and second gap;
  (c) first secondary coil means disposed on the electromagnetic core, for producing an electrical signal in response to the proportion of the magnetic flux flowing across the first gap;
  (d) second secondary coil disposed on the electromagnetic core, for producing an electrical signal in response to the proportion of the magnetic flux flowing across the second gap; and
  (e) pole piece means extending into the first gap and the second gap, for separately carrying at least a portion of the electromagnetic flux across the first and second gaps, and independently and separately varying a reluctance to the magnetic flux across the first and second gaps as a function of the differential displacement of the structure, a differential in the electrical signals produced in the first and second secondary coil means being indicative of the differential displacement of the structure.

19. The LVDT of claim 18, wherein the pole pieces means comprise a first pole piece and a second pole piece, each pole piece being connected to a different portion of the structure so that differential displacement of the portions of the structure causes one of the first and second pole pieces to move farther into the gap and the other of the first and second pole pieces to move farther out of the gap, thereby increasing the magnetic flux through said one pole piece and decreasing it through said other pole piece.

20. The LVDT of claim 19, wherein the first and second pole pieces move in a direction generally aligned with a plane through a center of the core.

21. The LVDT of claim 19, wherein the first and second pole pieces move in a direction generally transverse to a plane through a center of the core.

22. The LVDT of claim 18, further comprising differential current sensing means connected to the first and second secondary coil means, for sensing a differential in the electrical signals induced therein as a result of differences in the magnetic flux through the pole piece means in the first and the second gap.

23. The LVDT of claim 18, further comprising supply means for supplying an alternating current to the primary coil means.

24. The LVDT of claim 23, further comprising automatic gain control means connected to the first and second secondary coil means and to the supply means, for modulating the magnitude of the alternating current supplied to the primary coil means as a function of a sum of the electrical signals produced by the first and the second secondary coils, so that the total magnetic flux produced by the primary coil means is substantially constant, to compensate for changes in the total magnetic flux due to a common mode displacement of the pole piece means within the first and the second gaps.

25. The LVDT of claim 18, wherein displacement of either the first or second pole piece in a direction transverse to said differential displacement of the structure does not significantly change the reluctance of the first or second pole piece, so long as said pole pieces do not contact the core and the extent of overlap of the first or second pole piece and the core does not change.

26. A method for sensing a displacement, comprising the steps of:

(a) providing an electromagnetic core that includes integral sections, spaced apart to define a first gap and a second gap;

(b) producing a magnetic flux across the first and the second gap;

(c) producing a first electrical signal in response to the proportion of the magnetic flux flowing across the first gap;

(d) producing a second electrical signal in response to the proportion of the magnetic flux flowing across the second gap;

(e) providing a pair of pole pieces, each separately disposed within one of the first and the second gaps; and (f) separately varying reluctance to the magnetic flux across the first and the second gaps through the pole pieces as a function of the displacement of the pole pieces, a differential between the first and second electrical signals produced in response to the magnetic flux passing through the pole pieces respectively in the first and second gaps being indicative of the displacement.

27. The method of claim 26, wherein the pair of pole pieces both move in a direction generally aligned with a plane through a center of the core.

28. The method of claim 26, wherein the pair of pole pieces both move in a direction generally transverse to a plane through a center of the core.

29. The method of claim 26, further comprising the step of modulating the magnitude of an alternating current supplied to produce the magnetic flux as a function of a sum of the first and second electrical signals, so that the total magnetic flux is substantially constant, to compensate for changes due to a common mode displacement of the pole pieces within the first and the second gaps.

30. The method of claim 26, wherein displacement of a pole piece in a direction transverse to said displacement of the structure or rotation of pole piece within one of the first and second gaps does not significantly change the reluctance of the pole piece, so long as the pole piece does not contact the core causing frictional errors and the extent of its overlap of the core within one of the first and second gaps does not change.

* * * * *